(12) United States Patent
Nourbakhsh et al.

(10) Patent No.: US 8,503,469 B2
(45) Date of Patent: Aug. 6, 2013

(54) NETWORK ACCESS DEVICE WITH SHARED MEMORY

(75) Inventors: Seyed-Hami Nourbakhsh, Nuremberg (DE); Helmut Steinbach, Greding (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 787 days.

(21) Appl. No.: 12/619,094

(22) Filed: Nov. 16, 2009

(65) Prior Publication Data

US 2010/0180006 A1    Jul. 15, 2010

Related U.S. Application Data

(60) Provisional application No. 61/114,639, filed on Nov. 14, 2008.

(30) Foreign Application Priority Data

Nov. 14, 2008 (EP) ..................................... 08019942

(51) Int. Cl.
*H04L 12/28* (2006.01)
(52) U.S. Cl.
USPC ............... 370/419; 370/469; 710/8; 710/104; 710/311; 710/312; 711/130; 711/148; 711/153; 711/158; 711/168
(58) Field of Classification Search
USPC .............. 370/419, 420, 469; 710/8, 104, 305, 710/306, 311, 312; 711/130, 147, 148, 153, 711/154, 155, 158, 168, 173
See application file for complete search history.

(56) References Cited

U.S. PATENT DOCUMENTS

| | | | |
|---|---|---|---|
| 5,546,385 A * | 8/1996 | Caspi et al. | 370/412 |
| 5,909,704 A * | 6/1999 | Ireland | 711/219 |
| 6,715,042 B1 | 3/2004 | Mirza et al. | |
| 7,130,312 B1 * | 10/2006 | Amagai et al. | 370/469 |
| 7,640,370 B1 * | 12/2009 | Phung et al. | 710/8 |
| 2008/0151765 A1 * | 6/2008 | Cheruvathery | 370/252 |

FOREIGN PATENT DOCUMENTS

WO    WO 2004/062137 A    7/2004

* cited by examiner

*Primary Examiner* — Alvin Zhu

(57) ABSTRACT

A technique for providing network access in accordance with at least one layered network access technology comprising layer 1 processes and layer 2 processes is described. In a device implementation, the technique comprises a shared memory adapted to store at least layer 1 data and layer 2 data as well as a memory access component coupled to the shared memory and comprising a first client port adapted to receive memory access requests from a layer 1 processing client and a second client port adapted to receive memory access requests from a layer 2 processing client. The memory access component is configured to serve a memory access request from the layer 1 processing client with a lower priority than a memory access request from the layer 2 processing client. In particular, the memory access component may be adapted to prioritize reading of layer 1 data by the layer 2 processing client over writing of layer 2 data by the layer 1 processing client.

19 Claims, 8 Drawing Sheets

NETWORK ACCESS DEVICE WITH SHARED MEMORY

CROSS-REFERENCE TO RELATED APPLICATIONS

This application claims the benefit of U.S. Provisional Application No. 61/114,639, filed Nov. 14, 2008, the disclosure of which is fully incorporated herein by reference.

TECHNICAL FIELD

The disclosure generally relates to a device that provides network access in accordance with at least one Network Access Technology (NAT). Specifically, the disclosure concerns a network access device with two or more components configured to access memory resources of the network access device during NAT-related processing operations.

BACKGROUND

Network access devices relying on wired NATs or wireless NATs—sometimes also called Radio Access Technologies (RATs)—have become ubiquitous. As regards RATs, stationary communication networks such as Wireless Local Area Networks (WLANs) as well as mobile communication networks are commonly known.

In the last two decades, digital mobile communication technologies have almost fully replaced analog mobile communication systems, also referred to as first generation systems. With the early digital communication systems (or second generation systems) such as the Global System for Mobile communication (GSM), a wide-spread acceptance and use of mobile telephony services has begun. Today, third generation systems such as the Universal Mobile Telecommunication System (UMTS) as standardized by the $3^{rd}$ Generation Partnership Project (3GPP) offer a plethora of sophisticated multimedia features and novel mobile applications including, for example, personal navigation via the Global Positioning System (GPS). Fourth generation technologies are already about to enter the standardization phase.

Since the earliest Release 99 of the 3GPP specifications, UMTS uses W-CDMA (Wideband Code Division Multiple Access) as high speed transmission protocol on the air interface. The performance of the W-CDMA-based UMTS standard is extended and improved by a collection of technologies known as High Speed Packet Access (HSPA) protocols. Two different protocols, High Speed Downlink Packet Access (HSDPA) and High Speed Uplink Packet Access (HSUPA), have been standardized by 3GPP. HSPDA is part of the UMTS specifications since Release 5, while the specifications for HSUPA are included in Release 6.

A further enhancement of the UMTS standard, Evolved HSPA (eHSPA) or HSPA+, will be introduced with Release 7. Evolved HSPA provides even higher data rates on both the uplink and the downlink using sophisticated technologies such as antenna diversity (Multiple Input Multiple Output, or MIMO) and higher order modulation. While eHSPA still relies on W-CDMA, the Long Term Evolution (LTE) project of 3GPP is defining a new air interface that will be implemented with Release 8 of the 3GPP specifications.

The parallel existence of various 3GPP Releases makes it desirable for a single item of hardware (such as a mobile telephone) to provide support for Radio Access Technologies (RATs) defined in different Releases. Such multi-Release support increases the overall connectivity. As one example, a multi-Release mobile telephone may automatically perform radio access via an "older" Release RAT if the locally available radio network infrastructure is not compatible with a newer Release RAT also supported by the mobile telephone. Then, an automatic hand-over from the older Release RAT to the newer Release RAT is performed as soon as the mobile telephone enters the coverage area of radio network infrastructure supporting the newer Release RAT.

In mobile telephones, support for a new Release (either singly or in combination with support for one or more previous Releases) also requires a new hardware design. As each new Release moves the maximum data rate to a higher limit, the hardware requirements are also becoming increasingly demanding in relation to parameters such as signal processing speed, data storage size, data transfer latency and data throughput. It is evident that the hardware requirements are particularly demanding in case a new hardware design with multi-Release support is desired or if multi-Release support shall at least be a future option for the new hardware design.

Hardware designs for devices supporting high maximum data rates often suffer from a comparatively high data transfer latency and from expensive technological efforts to achieve the necessary data throughput. It has empirically been found that these sufferings can in part be attributed to the internal memory configuration of the devices and in particular the repeated transfer of data between distributed physical memories.

SUMMARY

There is a need for a network access device that has an improved memory configuration avoiding one or more of the drawbacks outlined above.

This need is satisfied by a device for providing network access in accordance with at least one layered network access technology comprising layer 1 processes and layer 2 processes, wherein the device comprises a shared memory adapted to store at least layer 1 data and layer 2 data, and a memory access component coupled to the shared memory and comprising a first client port ("low priority client port") adapted to receive memory access requests from a layer 1 processing client and a second client port ("high priority client port") adapted to receive memory access requests from a layer 2 processing client. The memory access component is adapted to serve a memory access request from the layer 1 processing client with a lower priority than a memory access request from the layer 2 processing client.

Implementing a memory shared at least by a layer 1 processing client and a layer 2 processing client reduces the number of times data have to be moved through different physical memories. The shared memory thus reduces data handling operations and generally increases data throughput. By granting higher priority to memory access requests from the layer 2 processing client in relation to the layer 1 processing client, it can, for example, be ensured that the layer 1 data are quickly processed by layer 2 processes. This prioritization takes into account that layer 2 processes typically require higher computational efforts than layer 1 processes and in certain situations avoids an excessively large memory portion for storing layer 1 data.

As understood herein, a component can be an item of software (e.g., a software module or program), an item of hardware (e.g., a processor or hardware accelerator) or a combination thereof. A processing client may likewise be an item of software, an item of hardware or a software/hardware combination. Layer 1 data may comprise data that has been processed and/or is still to be processed by a layer 1 process.

In a similar manner, layer 2 data may comprise data that has been processed or is still to be processed by a layer 2 process.

In relation to the present disclosure, a layer is a collection of one or more concep-tually similar communication functions (or communication protocols) that generally provides services to a layer above it and receives services from a layer below it. There exist various models defining the succession of the individual layers, such as the 7 layer reference model of the Open Systems Interconnection (OSI) initiative. Other common definitions specify models with less layers (such as the 5 layer Transmission Control Protocol, or TCP, model).

Layer 1 (also called physical layer) functions generally translate communication requests from layer 2 (also called link layer) functions into hardware-specific operations to affect transmission or reception of data. As such, there will be no further "layer" below layer 1. Layer 2 functions generally handle the transfer of data between network entities. Layer 2 functions may additionally detect and possibly correct errors that may occur in layer 1. In the context of the present disclosure, layer 1 processing may include one or more of the following signal processing operations: Signal modulation, transmission error control, signal spreading, channel coding, turbo coding and encryption (ciphering). Layer 2 processing may include one or more of the following signal processing operations: Medium Access Control (MAC), Radio Link Control (RLC), and Packet Data Convergence Protocol (PDCP) processing.

In one implementation, the memory access component is adapted to prioritize reading of layer 1 data by the layer 2 processing client over writing of layer 1 data by the layer 1 processing client. This implementation may ensure that the amount of layer 1 data stored in the shared memory will not grow excessively, and thus improve the overall data throughput.

As one aspect of prioritizing the layer 2 processing client, the client port of the memory access component may be dedicated to the layer 2 processing client. In order words, the high priority client port may be solely reserved for being coupled to the layer 2 processing client. On the other hand, the memory access component may be configured to multiplex to the low priority client port client memory access requests from a set of two or more clients comprising the layer 1 processing client. The one or more additional clients that may be coupled to the low priority client port of the memory access component may comprise at least one of a Direct Memory Access (DMA) processing client and a Universal Serial Bus (USB) processing client.

The multiplexing of the memory access requests received from the set of low priority clients may be performed by an access arbiter of the memory access component. The access arbiter may be coupled between the low priority client port on the one hand and the set of clients comprising the layer 1 processing client on the other. The access arbiter may be adapted to multiplex the memory access requests onto the low priority port of the memory access component. In one variant this multiplexing is performed such that each memory access request is treated with the same priority. In another variant, memory access requests received from one or more specific low priority clients may be prioritized by the multiplexing operation performed by the access arbiter.

The access arbiter may provide a dedicated arbiter port for each client of the set of low priority clients. The memory access component may be configured to service memory access requests received at the arbiter ports from the set of low priority clients at a fraction of a clock frequency of the shared memory. Memory access requests received at the low priority client port (onto which the access arbiter multiplexes the memory access requests) may be serviced at a fraction of the clock fre-quency of the shared memory as well. The memory access component may further be configured to service memory access requests received at the high priority client port also at a fraction of the clock frequency of the shared memory.

The memory access component may further comprise a memory access controller providing the (at least one) high priority client port for the layer 2 processing client and the (at least one) low priority client port for the layer 1 processing client and one or more further low priority clients. The memory access controller may be configured to multiplex to the shared memory the access requests received via the high priority client port and the low priority client port. In this regard, the memory access controller may be configured to enable full collision memory access (at least up to a specific bandwidth limit) among its client ports. The memory access controller may also be configured to assign different priorities to memory access requests received via different client ports (e.g., to prioritize the high priority client port).

The shared memory may be divided into two or more memory partitions. For example, the shared memory may comprise a first partition for storing layer 1 data and a second partition for storing layer 2 data. Optionally, the shared memory may comprise one or more additional partitions for storing at least one of layer 3 data, Internet Protocol (IP) data units, application data and Inter Processor Communication (IPC) information.

In the case of a partitioned shared memory, data movement within at least one of the partitions or from one partition to another partition may be performed by pointer operations or using linked lists. The concept of linked lists is known, for example, from C, C++ and Java. Such a data movement approach avoids the transfer of data between different physical memories and thus increases data throughput and reduces data transfer latency.

The shared memory may comprise a ring buffer (also called circular buffer) for storing layer 1 data. The ring buffer may be divided into a predefined number of individual memory segments, with each memory segment being configured to receive one layer 1 transport block. In the ring buffer, older transport blocks may thus automatically be overwritten by newer transport blocks, which avoids memory allocation and freeing operations in relation to the layer 1 data.

The data (such as the layer 1 data and the layer 2 data) stored in the shared memory may be user data. Additionally, control data may be stored in the shared memory. Such control data may, for example, be stored in the context of a memory-based communication. The memory-based communication via the shared memory may take place between at least the layer 1 and layer 2 processing clients.

The device may be realized in the form of a semi-finished product only comprising the shared memory and the memory access component. In another configuration, the device may additionally comprise the layer 1 processing client coupled to the low priority client port (e.g., via the access arbiter and the associated arbiter port). Additionally, or in the alternative, the device may comprise the layer 2 processing client coupled to the high priority client port. At least the one or more clients (such as the layer 1 processing client) coupled to the low priority client port may comprise a FIFO-based memory interface towards the low priority client port (and, optionally, towards the respective arbiter port). In one implementation, the FIFO-based memory interfaces are used to bridge different clock domains on opposite sides of the interfaces.

The memory access component or any component thereof (such as the access arbiter or the memory access controller)

may be realized in the form of at least one of an Intellectual Property (IP) core, an Application Specific Integrated Circuit (ASIC), a Field Programmable Gate Array (FPGA) and a Digital Signal Processor (DSP). The clients coupled to the memory access component may likewise be realized as at least one of an IP core, an ASIC, an FPGA and a DSP. The shared memory may be realized in the form of a Random Access Memory (RAM) module.

The device as a whole may be configured as a semi-finished product (e.g., in the form of a chip or chipset). In another implementation, the device is a finished product such as a mobile terminal. Exemplary mobile terminals include mobile telephones, network or data cards (e.g., for use with a mobile computer), and Personal Digital Assistants.

According to a further aspect, a method for providing network access in accordance with at least one layered network access technology comprising layer 1 processes and layer 2 processes is provided, wherein the method comprises storing at least layer 1 data and layer 2 data in a shared memory, receiving memory access requests from a layer 1 processing client and a layer 2 processing client, and performing access arbitration in relation to the shared memory such that a memory access request from the layer 1 processing client is served with a lower priority than a memory access request from the layer 2 processing client. In one realization, access arbitration is performed such that reading of layer 1 data by the layer 2 processing client is prioritized over writing of layer 1 data by the layer 1 processing client.

According to a still further aspect, a computer program product is provided. The computer program product comprises program code portions for performing one or more of the steps of one or more of the methods described herein when the computer program product is run or executed on one or more processors. The computer program product may be stored on a computer-readable recording medium such as a permanent or re-writable memory, a CD-ROM, or a DVD. The computer program pro-duct may also be provided for download via a computer network such as the Internet, a mobile communication network or a wireless or wired Local Area Network (LAN).

BRIEF DESCRIPTION OF THE DRAWINGS

In the following, further technical details and advantages will be discussed in connection with exemplary embodiments illustrated in the drawings, wherein.

DETAILED DESCRIPTION

In the following description, for purposes of explanation and not limitation, specific details are set forth, such as specific device configurations and specific signalling scenarios in order to provide a thorough understanding of the techniques disclosed herein. It will be apparent to one skilled in the art that these techniques may be practiced in other embodiments that depart from these specific details. The skilled artisan will appreciate, for example, that the techniques discussed herein may be practiced in combination with other device configurations and different signalling steps.

While the exemplary embodiments relate to a device providing multi-RAT support, it will be appreciated that the techniques discussed herein may also be practiced in relation to single RAT support. Moreover, while a RAT provides wireless network access, it will be apparent to the skilled artisan that the techniques presented herein can also be practiced in connection with one or more wired NATs such as Digital Sub-scriber Line (DSL) technologies.

The exemplary embodiments will primarily be described in relation to RATs conforming to various 3GPP Releases. The various "Releases" of the 3GPP specifications exist in parallel to provide developers with a stable platform for implementation while at the same time allowing the addition of new technical features. Each 3GPP Release can be considered as a separate Radio Access Technology (RAT), although it will incorporate certain features of the previous Release(s). It will be readily apparent that the techniques described herein may also be practiced in context with one or more non-3GPP RATs.

Those skilled in the art will further appreciate that the methods, steps and functions explained herein may be implemented using individual hardware circuitry, using software functioning in conjunction with a programmed microprocessor or general purpose computer, using one or more ASICs, one or more DSPs and/or one or more FPGAs. It will also be appreciated that the techniques disclosed herein may be embodied in a processor and a memory coupled to the processor, wherein the memory stores one or more programs that perform the steps discussed herein when executed by the processor.

Figure 1:
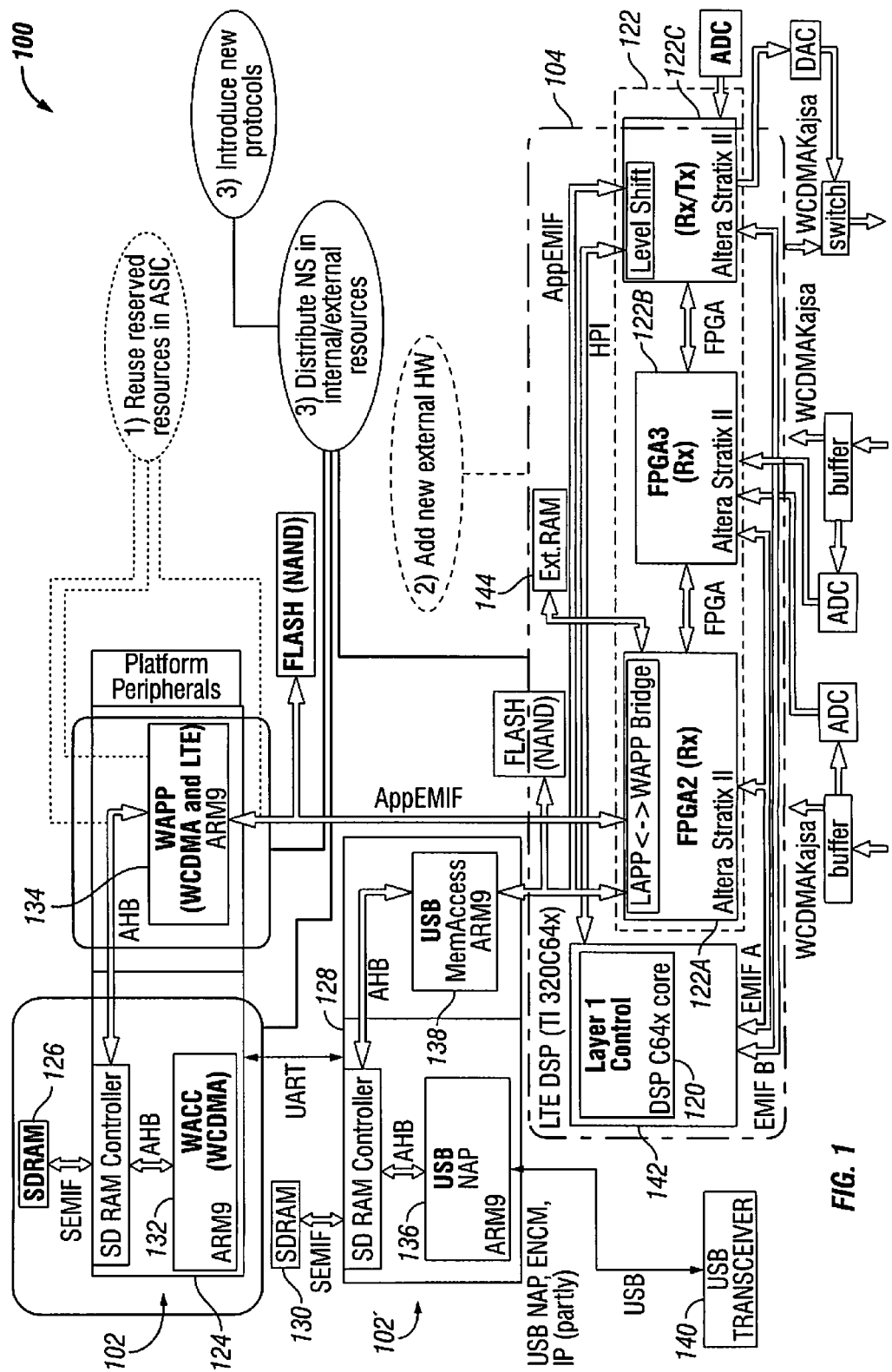
FIG. 1 shows an embodiment of a device for providing network access in accordance with two radio access technologies.

FIG. 1 illustrates the hardware configuration of an exemplary device embodiment. The device 100 illustrated in FIG. 1 is configured as a mobile telephone or network card providing network access in accordance with two RATs, namely W-CDMA-based UMTS (Release 99/Release 6) and eHSPA (Release 7). The hardware configuration of the device 100 shown in FIG. 1 is derived from an existing hardware design of a device providing W-CDMA-based UMTS access access only. This means that support for eHSPA had to be newly added to the existing design as will now be explained in more detail.

In the present embodiment, the previously existing hardware components include a first hardware module 102 comprising a W-CDMA baseband processing ASIC 124 ("W-CDMA module") as well as a further hardware module 102' comprising an USB controller ASIC 128 ("USB module"). As shown in FIG. 1, the W-CDMA module 102 comprises a memory (a Synchronous Dynamic Random Access Memory, or SDRAM) 126 coupled via dedicated interfaces to the W-CDMA baseband processing ASIC 124. In a similar manner, the USB module 102' comprises a memory (SDRAM) 130 coupled via dedicated interfaces to the ASIC 128.

As understood herein, a hardware module (also called hardware platform) is a delimited item of integrated circuitry such as a chip or chip set. The hardware module may consist of or comprise at least one of an ASIC, an FPGA and a DSP. The hardware module may also comprise multiple such hardware components. Moreover, the hard-ware module may comprise dedicated interfaces for communicating with one or more other hardware modules or other items of circuitry. Such interfaces comprise hardware interfaces, software interfaces and combinations thereof.

The W-CDMA module 102 and the USB module 102' comprise multiple software-controlled processing resources. In the present embodiment, the software-controlled processing resources include processors such as Central Processing Units (CPUs). As is known in the art, a CPU may be integrated in an ASIC or a DSP. Alternatively, a CPU may also be realized in a stand-alone configuration. The software-controlled processing resources may be coupled to one or more memories that store processing instructions (such as a computer program) for controlling the software-controlled processing operations performed by the processor.

As shown in FIG. 1, each of the W-CDMA baseband processing ASIC 124 and the USB baseband processing ASIC 128 comprise software-controlled processing resources in the form of a pair of dedicated processors (ARM9 CPUs) 132, 134, 136, 138 each. Each of the processors 132, 134, 136, 138 has access to internal ASIC memory resources (and, additionally or alternatively, to optional external memory resources) that store the processing instructions (programs) controlling the respective processing operations carried out by the processors 132, 134, 136, 138.

A first processor 132 of the W-CDMA baseband processing ASIC 124 performs, inter alia, network access-related processing operations ("WACC processor 132), while the second processor 134 performs, inter alia, application-related processing operations ("WAPP processor 134). It should be mentioned that the two processors 132, 134 perform further processing operations, and for this reason the terms WACC and WAPP have only been chosen to indicate the general purpose of the respective processor 132, 134.

The application-related processing operations performed by the WAPP processor 134 include Voice-over-Internet Protocol (VoIP) processing and File Transfer Protocol (FTP) processing. The network access-related processing operations performed by the WACC processor 132 include layer 1 processing (mainly Release 99/Release 6 layer 1 processing such as 16 QAM and QPSK modulation and demodulation control, handling of common and control channels, etc.) as well as layer 2, layer 3 and higher layer processing (such as MAC, RLC, PDCP, RRC, and Internet Protocol processing) in accordance with 3GPP Release 99/Release 6.

Not shown in FIG. 1 are hardware accelerators located as IP blocks on the ASIC 124 and performing layer 1 processing in accordance with 3GPP Release 99/Release 6 (such as 16 QAM and QPSK modulation and demodulation, spreading, and channel coding). A hardware accelerator is a piece of hardware that performs predefined processing operations typically faster than software-controlled processing resources. The hardware accelerator may be integrated (e.g., as an IP core) in an ASIC, FPGA or DSP.

In the embodiment of FIG. 1, the USB module 102' is mainly used to provide high-speed network access to an external device (such as a Personal Computer or Laptop; not shown) that may be selectively coupled to the device 100 via a USB transceiver 140. For this reason, one of the tasks of the processor 136 is USB-related Network Access Protocol (NAP) processing. The processor 136 thus runs the USB-related communication protocol stack and performs this task also for the WACC processor 132 (in case the external device is provided with W-CDMA-based network access). The processing operations performed by the processor 136 thus include layer 1, 2 and 3 processing. The processor 138 is used to allow the processor 136 access external memory in which one or more of the layer 1 data, the layer 2 data and the layer 3 data are stored. The processor 138 further handles user data exchange between the WAPP processor 134 and the processor 136 for data transmitted via the USB transceiver 140.

Having thus discussed the configuration of the previously existing components of the hardware architecture illustrated in FIG. 1, the architectural changes made to provide additional support for eHSPA will now be described in more detail. It is important to note that these changes do not require a major re-design of any of the existing W-CDMA module 102 and USB module 102'. Instead, the existing hardware is to a large extent re-used with only minor modifications, and new hardware components are added. In brief, freely available hardware resources in the existing ASICs are dedicated to eHSPA-related processing, the existing ASICs are extended externally with new hardware components, and the network signalling is newly distributed.

As illustrated in FIG. 1 for the example of the W-CDMA module 102, the architectural changes regarding eHSPA support involve three distinct modifications. First, available processing capabilities of the W-CDMA baseband processing ASIC 124 (including reserved software-controlled processing resources) are re-used for specific eHSPA processing tasks. Second, a new hardware module 104 is added that comprises the necessary hardware components for eHSPA support ("eHSPA module"). Finally, in step three, eHSPA-related network signalling is distributed within the W-CDMA module 102. Furthermore, new communication protocols within the W-CDMA module 102 and between the W-CDMA module 102 and the eHSPA module 104 are introduced in the third step. While these individual steps will now be described in more detail in relation to the W-CDMA module 102, it will be appreciated that similar steps are per-formed in relation to the UBS module 102'.

In the first step, spare, reserved or redundant hardware resources of the W-CDMA baseband processing ASIC 124 are dedicated to eHSPA-related processing tasks. Such hardware resources include additional or reserved software-controlled processing power of the WACC processor 132 and the WAPP processor 134, interfaces (such as memory or serial interfaces), interrupts as well as internal and external buses and bridges. Such resources may also include memory resources for storing processing instructions (e.g., in the form of one or more programs) related to eHSPA-specific processing operations. For example, new layer 2 software modules (MACevo, RLCevo for the downlink, PDCPevo, etc. as will be explained below with reference to FIG. 2) are stored in the available memory resources for being executed by the WAPP processor 134. The existing part of the W-CDMA baseband processing ASIC 124 is used to cover the unchanged requirements of eHSPA (compared to Release 99/Release 6) and the requirements of W-CDMA-based UMTS (Release 99/Release 6). Such existing parts include, for example, the legacy layer 2 software modules (MAC, RLC, PDPC, etc.). Additionally, a communication mechanism between the legacy software modules and the eHSPA software modules is provided. This communication mechanism will also be described in more detail later on with reference to FIG. 2.

Since the layer 3 and USB processing functionalities of the W-CDMA baseband processing ASIC 124 do not reach the performance needed to fulfill the eHSPA requirements, the corresponding functionalities of the USB module 102' are used by the eHSPA module 104. As a result, the USB module 102' has to be modified in a similar manner as the W-CDMA module 102 for the provision of eHSPA-based network access via the USB transceiver 140 to an external device. For example, reserved processing power of the processor 138 is used to perform eHSPA layer 2 processing, and the corresponding processing instructions are stored in available memory resources of the USB controller ASIC 128.

As the second modification of the existing device architecture, the eHSPA module 104 with several new hardware components is added as shown in FIG. 1. The distribution of eHSPA processing among the W-CDMA and USB modules 102, 102' on the one hand and the eHSPA module 104 on the other hand allows a lean and flexible realization of the eHSPA module 104 using, for example, DSP and FPGA technologies instead of ASICs (although an ASIC-based implementation would in principle also be feasible). This approach optimizes the costs and risks associated with introducing eHSPA. Moreover, the processing load associated with high-speed eHSPA data transfer can be shared between one or both of the legacy modules 102, 102' and the new eHSPA module 104.

The main hardware components of the eHSPA module 104 include a DSP 142, several FPGAs 122A, 122B, 122C (jointly referred to as FPGAs 122), and a shared memory (RAM) 144 that is used in the present embodiment primarily for user data sto-rage of layer 1 data and layer 2 data in the eHSPA downlink direction. The largest part of eHSPA layer 1 processing is performed by hardware accelerators as included in the FPGAs 122.

Layer 1 processing performed, for example, by the hardware accelerators in the FPGA 122B includes turbo decoding, transmission error control, and optional user data encryption (ciphering). The hardware accelerators of the FPGA 122A are primarily in charge of memory management (e.g., for providing Direct Memory Access, or DMA) in context with moving data from a layer 1 memory partition to a layer 2 memory partition. The hardware accelerators of the FPGA 122C perform, inter alia, 64 QAM demodulation and RAKE processing. The hardware accelerators of the FPGAs 122 are realized in the form of IP cores.

The DSP 142 further comprises a processor 120 that controls the hardware accelerators in the FPGAs 122 and other IP cores of the eHSPA module 104 in relation to eHSPA layer 1 processing operations. For example, the DSP 142 controls channel estimation for MIMO, antenna tracking for 64 QAM, frame based and slot based signal processing, RAKE setup, and so on. The software controlling the processor 120 is stored in local memory resources of the DSP 142.

As has been mentioned above, the third modification regarding the existing hardware architecture as illustrated in FIG. 1 includes a splitting of network signalling internally within the existing hardware modules 102, 102'. In the exemplary case of the W-CDMA module 102, the network signalling is distributed among separate software modules running on two different processors. Specifically, Release 99/Release 6 signalling and eHSPA Enhanced Uplink (EUL) signalling is mainly run on the WACC processor 132, while eHSPA downlink signalling is mainly run on the WAPP processor 134.

Splitting the network signalling between two processors 132, 134 of one and the same hardware module 102 has the advantage that the handling of eHSPA downlink traffic has less influence on the strict timing requirements of EUL uplink traffic. Additionally, more processor time will become available for downlink traffic processing. As a further advantage, direct access of the processor in charge of downlink traffic pro-cessing (the WAPP processor 134) to the user data in the shared memory 144 as well as to the hardware accelerators of the eHSPA module 104 can be mentioned. In other words, the WAPP processor 134 sees the shared memory 144 as directly connected to and accessible by it.

Figure 2:
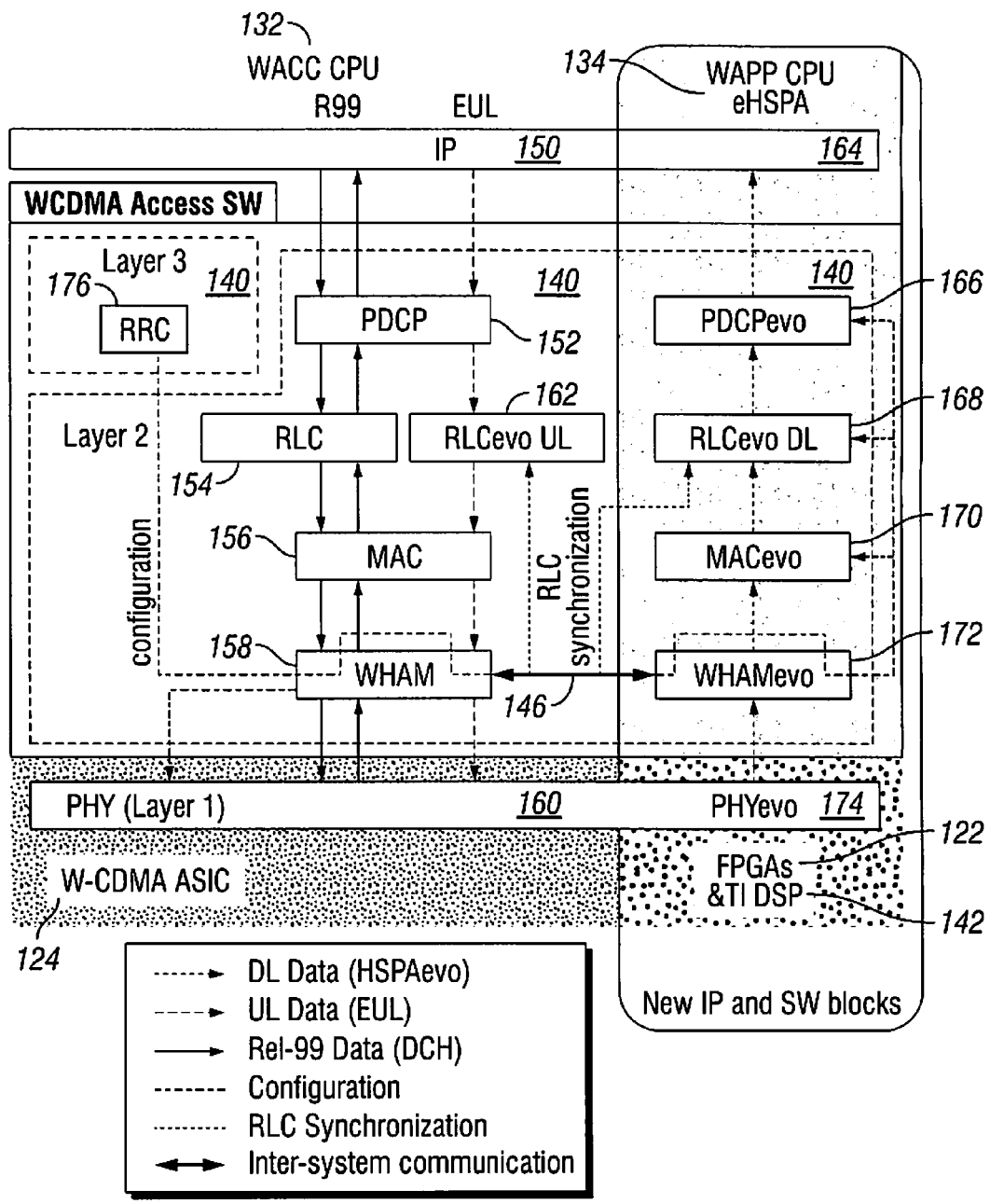
FIG. 2 illustrates the communication protocol functions involved in the data flows during operation of the device of FIG. 1.

FIG. 2 schematically illustrates the stack of communication protocols in the lower communication layers for the device 100 of FIG. 1. Moreover, FIG. 2 shows how the newly added eHSPA functionalities are distributed among the existing and new hardware and software components.

In short, the left hand side of FIG. 2 depicts the existing software modules (with some exceptions), while the right hand side illustrates (again with some exceptions) the new software modules. As illustrated on the upper part of FIG. 2, the (new and existing) software modules for IP layer processing, layer 3 processing and layer 2 processing run on either the WACC processor 132 (left hand side) or on the WAPP processor 134 (right hand side) of the W-CDMA baseband processing ASIC 124. The software modules for layer 1 processing control (e.g., for controlling the layer 1 processing hardware accelerators) run on one or both of the processors 132, 134 of the W-CDMA baseband processing ASIC 124 (left hand side) as well as on the DSP 142 (right hand side). The hardware accelerators for layer 1 processing are located on the W-CDMA baseband processing ASIC 124 (as far as the W-CDMA is concerned) as well as on the FPGAs 122 such as FPGA 122A (for eHSPA layer 1 processing).

One exception to the rule that the new eHSPA-related software modules run on the WACC processor 132 is eHSPA EUL processing. Although newly introduced in context with eHSPA, EUL processing is mainly based on the existing software (and hardware) modules and thus performed by the WACC processor 132. Processing of eHSPA downlink traffic on the other hand is performed by the WACC processor 132 under the control of the newly introduced software modules. Thus isolated data paths for eHSPA uplink traffic and eHSPA downlink traffic are created. Splitting of the data paths among the two different processors 132, 134 has the advantage that the strict timing requirements of EUL processing by the WACC processor 132 have less influence on eHSPA downlink traffic handling by the WAPP processor 134. Additionally, more processor time for eHSPA downlink traffic handling is obtained since the WAPP processor 134 is disburdened from EUL processing. As a result, load sharing between the two processors 132, 134 in relation to eHSPA traffic processing is achieved.

The splitting of eHSPA uplink traffic processing and eHSPA downlink traffic processing between the two different processors 132, 134 is facilitated by a newly established inter-processor communication link 146. The purposes of the communication link 146 include configuration and synchronisation signalling between software modules running on the different processors 132, 134. Moreover, the communication link 146 can be utilized to transfer both data and control information between the software modules. The communications performed via the communication link 146 are at least partially performed using memory-based communication (via, e.g., on-chip memory of the ASIC 124). Because of the communication link 146, the two different processors 132, 134 will appear to the outside as a single processing unit in relation to eHSPA uplink and downlink processing. Moreover, the eHSPA protocol stack will thus act as a single stack to the outside in spite of the fact that the various software modules are distributed among the two processors 132, 134.

As shown in FIG. 2, there exists a third data path that stretches in parallel to the EUL and eHSPA downlink data paths. The third data path is the legacy path adapted to perform Release 99/Release 6 uplink and downlink processing on the DCH Data Channel. Each of the three paths depicted in FIG. 2 can be considered as a separate signal processing chain. In the following, the functions of the individual software modules arranged to form the three signal processing chains will be discussed in more detail.

The DCH data path on the left hand side of FIG. 2 includes in a conventional manner legacy components in the form of an IP module 150, a PDPC module 152, an RLC module 154, a MAC module 156, a W-CDMA Hardware Abstraction Module (WHAM) 158 as well as layer 1 processing components 160. The layer 1 processing components 160 include a PHY software module (running on the WACC processor 132) as well as the corresponding hardware accelerators for layer 1 processing under control of the PHY software module. The data path for EUL traffic is identical to the DCH data path except for a replacement of the RLC module 154 with an RLCevo UL module 162.

The data path for eHSPA downlink processing includes a separate IP module 164 running on the WAPP processor 134, a PDCPevo module 166, an RLCevo DL module 168, a MACevo module 170, a WHAMevo module 172 as well as layer 1 processing components 174. The layer 1 processing components 174 include one or more software modules running on the DSP 142 as well as hardware accelerators residing on the FPGAs 122 and controlled by the DSP 142.

A layer 3 RRC module 176 executed by WACC processor 132 handles the configuration of the various software modules running on the WACC processor 132 (for both the DCH and EUL). In addition, the RRC module 176 is also responsible for eHSPA configuration on the WAPP processor 134 and triggers the setup of the network signalling stack to enable eHSPA reception on the downlink concurrently with EUL transmission. As illustrated in FIG. 2, the corresponding signalling between the WACC processor 132 and the WAPP processor 134 is transmitted via the communication link 146.

The legacy PDCP module 152 is essentially duplicated onto the WAPP 134 into a new PDCPevo module 166 to handle eHSPA downlink traffic. The PDCPevo module 166 also handles flow control and data delivery in the eHSPA downlink direction.

The legacy RLC module 154 remains responsible for data transfer on the DCH. For eHSPA operation, the RLC functionality is split into two RLCevo sub-modules 162, 168. By synchronization signalling via the communication link 146 it can be guaranteed that the RLCevo sub-modules 162, 168 work in a synchronized manner. To this end, status information including RLC variables, window positions and so on are exchanged between the two sub-modules 162, 168. Additionally, a control mechanism for the synchronized handling of RLC control Physical Data Units (PDUs) is implemented within the sub-modules 162, 168. The RLCevo DL module 168 has direct access to an RLC hardware accelerator on one of the FPGAs 122. The RLC hardware accelerator is in charge of concatenating PDUs into IP packets internally within the FPGA.

The legacy MAC module 156 remains responsible for DCH processing as well as for the EUL part of the EUL/eHSPA bearer. For eHSPA reception, the new MACevo module 170 is provided.

The main tasks of the WHAM module 158 and the WHAMevo module 172 include the provisioning of interfaces between layer 2 and layer 1 software modules. Additionally, interfaces between layer 2 software modules and various hardware components are provided.

Further optimizations may be performed in relation to MAC-hs reordering. For example, the MAC-hs reordering functionality for eHSPA downlink processing may remain in layer 2, but the out-of-sequence MAC-hs PDUs may remain stored in a PHY buffer (on the FPGA 122A) instead of being copied to the memory of the MACevo module 170 (such as the SDRAM 126 shown in FIG. 1).

Figure 3:
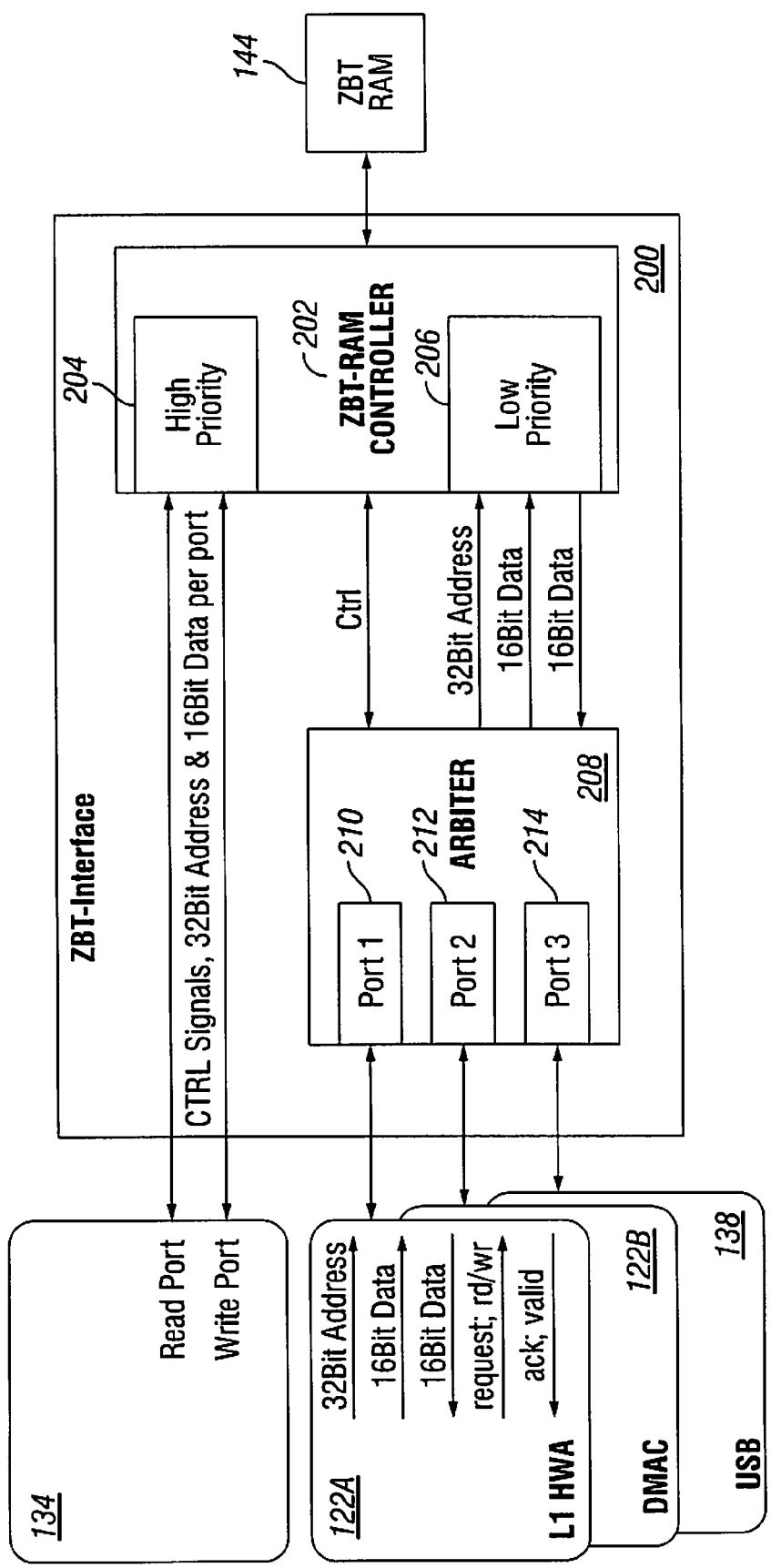
FIG. 3 is a schematic illustration of a shared memory and a memory access component belonging to the device shown in FIG. 1.

FIG. 3 illustrates in more detail the configuration of the shared memory 144 and of an associated memory access component 200 integrated as an IP core in the FPGA 122A. The memory access component 200 constitutes an interface component between processing clients (e.g., processors and hardware accelerators of the hardware modules 102, 102', 104) requesting memory access on the one hand and the memory 144 shared by these clients on the other hand.

The shared memory 144 is configured as a Zero Bus Turnaround (ZBT) RAM and located externally to the FPGA 122A. While the use of an external memory has certain technical advantages (and is less expensive) than FPGA or ASIC on-chip memory, such on-chip memory could be used in another embodiment not illustrated in the drawings. Moreover, it will be appreciated that instead of a ZBT RAM other memory types with high performance access capabilities, such as SDRAM (e.g., Double Data Rate 2, or DDR2, SDRAM), could be used.

The memory access component 200 comprises a memory access controller 202 with a high priority client port 204 and a low priority client port 206 as well as an access arbiter 208 coupled to the low priority client port 206 of the memory access controller 202. For this reason, the access arbiter 208 can be regarded as a port expansion of the low priority client port 206. The access arbiter 208 comprises three arbiter ports 210, 212, 214 for providing low priority clients via parallel interfaces access to the shared memory 144. In certain embodiments, the memory access controller 202 could have more than one high priority and/or low priority client port. Moreover, the access arbiter 208 could have more or less arbiter ports for low priority clients.

In one variant, memory access requests received via any of the client ports 204, 206 of the memory access controller 202 are served with the same priority by the memory access controller 202. In this variant, the client port 206 can still be regarded from the perspective of the multiple low priority clients coupled to the access arbiter 208 as being served with a lower priority (compared to a memory access request generated by the single client served via the "high priority" client port 204) as their requests are multiplexed by the access arbiter 208. In another variant, the memory access controller 202 explicitly grants priority to any memory access request received at the high priority client port 204 compared to a memory access request received via the access arbiter 208 at the low priority client port 206.

In the present embodiment, the high priority client port 204 is coupled to a single high priority client, namely the WAPP processor 134 that performs, inter alia, layer 2 processing for eHSPA downlink traffic. The WAPP processor 134 will thus access the shared memory 144 during layer 2 processing operations. The first arbiter port 210 is coupled to layer 1 processing clients, namely the hardware accelerators of the FPGA 122A. The hardware accelerators will access the shared memory 144, inter alia, during layer 1 turbo decoding operations and in context with transmission error control that is based on a Hybrid Automatic Repeat Request (HARQ) protocol. The second arbiter port 212 is coupled to a first Direct Memory Access Controller (DMAC) residing on the FPGA 122B and in charge of moving data from a layer 1 data partition of the shared memory 144 into a layer 2 data partition thereof. The third arbiter port 214 is coupled to a second DMAC (not shown) associated with the processor 136 and enabling the USB processor 138 to access the layer 1 and layer 2 data stored in the shared memory 144.

The DMACs may use linked lists stored in a specific portion of the shared memory 144 (or, alternatively, in another memory) to move data. Once the data has been moved, this is signalled by an interrupt to the processor in charge of the next processing operation. In this way, the data need not be transferred between different physical memories, which reduces data latency and increases data throughput. Moreover, no additional flag or information is needed in the shared (or other) memory 144 to avoid access violation or access collision during DMAC operation.

The memory access controller 202 and the access arbiter 208 each perform access control tasks in relation to the shared memory 144. For this reason, the memory access controller 202 can be regarded to perform a first stage of access control and the access arbiter 208 to perform a second stage. In the exemplary access control scenario of FIG. 3, the first stage allows full collision memory access in relation to the high priority client port 204 and the low priority client port 206. In other words, memory access requests arriving at any of the client ports 204, 206 will be granted immediately as the shared memory 144 is operated at a higher bandwidth (e.g., at 156 MHz) than the clients coupled to the various ports 204, 210, 212, 214 of the memory access component 200 (and operated, e.g., at 78 MHz or below).

The second stage of access control as performed by the access arbiter 208 enforces a predefined arbitration scheme in relation to the low priority clients. The arbitration scheme is configured such that the requests will be scheduled in case the requests collide. Additionally, FIFO buffers are introduced in the memory interfaces of the low priority clients 216, 218, 220 to temporarily store a memory access request until it can be served. The FIFO buffers also allow for a clock domain matching between the clock domain of the memory access component 200 and the shared memory 144 on the one hand and the clock domain of the various clients on the other hand. The size of the FIFO buffer is tailored to the individual clients such that the maximum data amount of a memory access request generated by a specific client at the given data rate can be accommodated.

Figure 4:
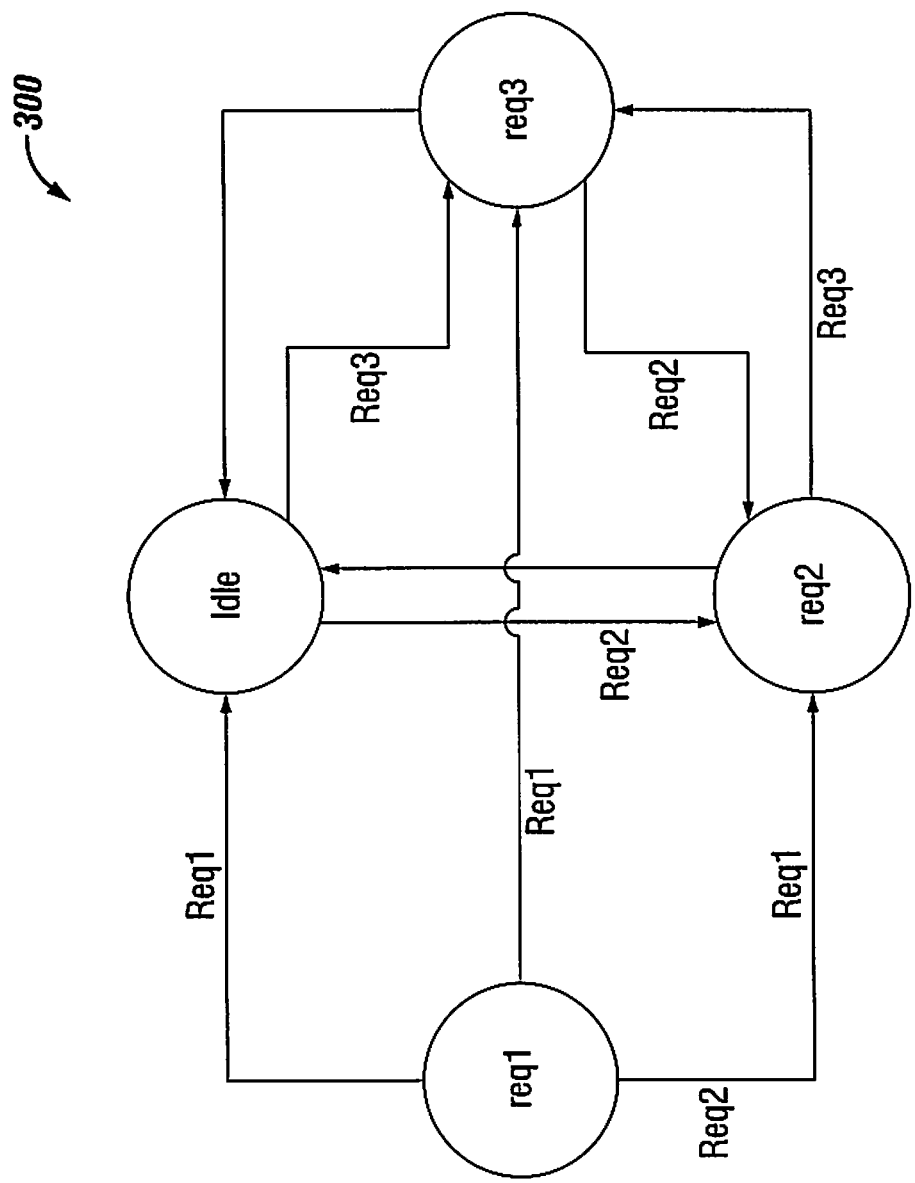
FIG. 4 illustrates a state machine of an access arbiter belonging to the memory access component shown in FIG. 3.

The request scheduling performed by the access arbiter 208 in the present embodiment specifies that in case more than one memory access request is received from the low priority clients at a time, the requests are served sequentially (time multiplexed) one after the other as illustrated in the exemplary state machine 300 of FIG. 4. As becomes apparent from the state machine 300, the access arbiter 208 serves one request and then goes back to idle (in other words, and to save arbitration efforts, the access arbiter 208 does not remain in a specific state). In the case of several concurrent memory access requests, the port at which the first request has been received is handled first, and then another port at which the next request has been received is handled. In the case of multiple requests, the requests are served in a round-robin manner. In an alternative scenario, the arbitration scheme enforced by the access arbiter 208 may be configured such that memory access requests received from one or more of the low priority clients (i.e., one or more of the ports 210, 212, 214) are prioritized.

In the following, the operation of the memory access component 200 as shown in FIG. 3 in the context of eHSPA downlink traffic processing (data path on the right hand side of FIG. 2) will be described with reference to the schematic timing diagram 500 of FIGS. 5a and 5b. The diagram 500 illustrates how the memory access controller 202 controls accesses to the shared memory 144 by the high priority client 134 directly coupled to the high priority client port 204 on the one hand and by the three low priority clients 122A, 122B, 138 coupled via the access arbiter 208 to the low priority client port 206 on the other hand (see FIG. 3).

The high priority client is the WAPP processor 134 in the context of eHSPA layer 2 downlink processing (including WHAMevo processing, MACevo processing, RLCevo DL processing, and PDPCevo processing; see FIG. 2). The low priority clients include the hardware accelerators of the FPGA 122A in relation to layer 1 processing (e.g., the writing of newly received layer 1 transmission blocks into the shared memory 144), the DMA of FPGA 122 B (in the form of an IP core) as well as the processor 138 in the context of USB data transfer via the USB transceiver 140 to and from an external device.

Figure 5A:
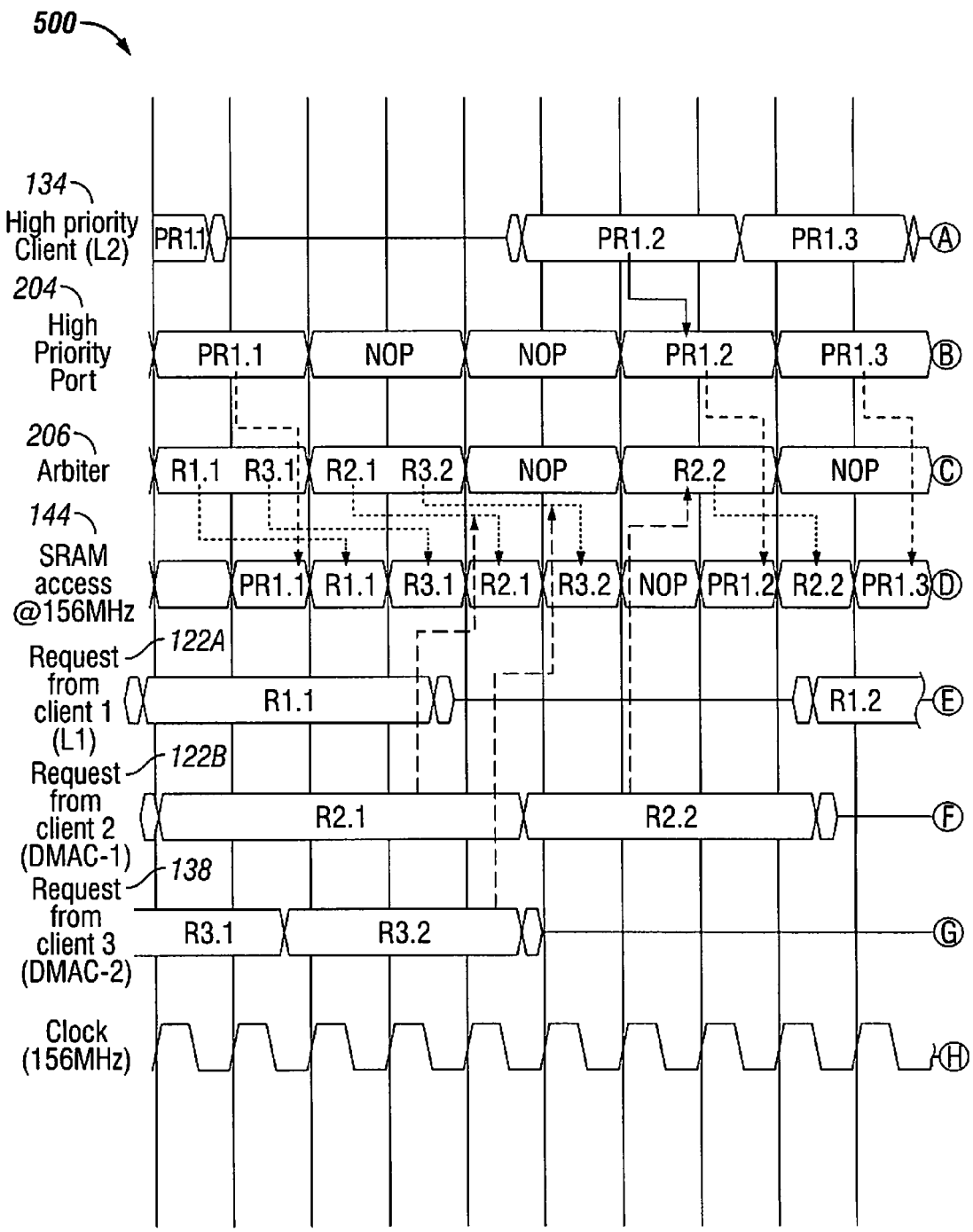
FIGS. 5a and 5b illustrate a schematic timing diagram illustrating the operation of the memory access component shown in FIG. 3.
Figure 5B:
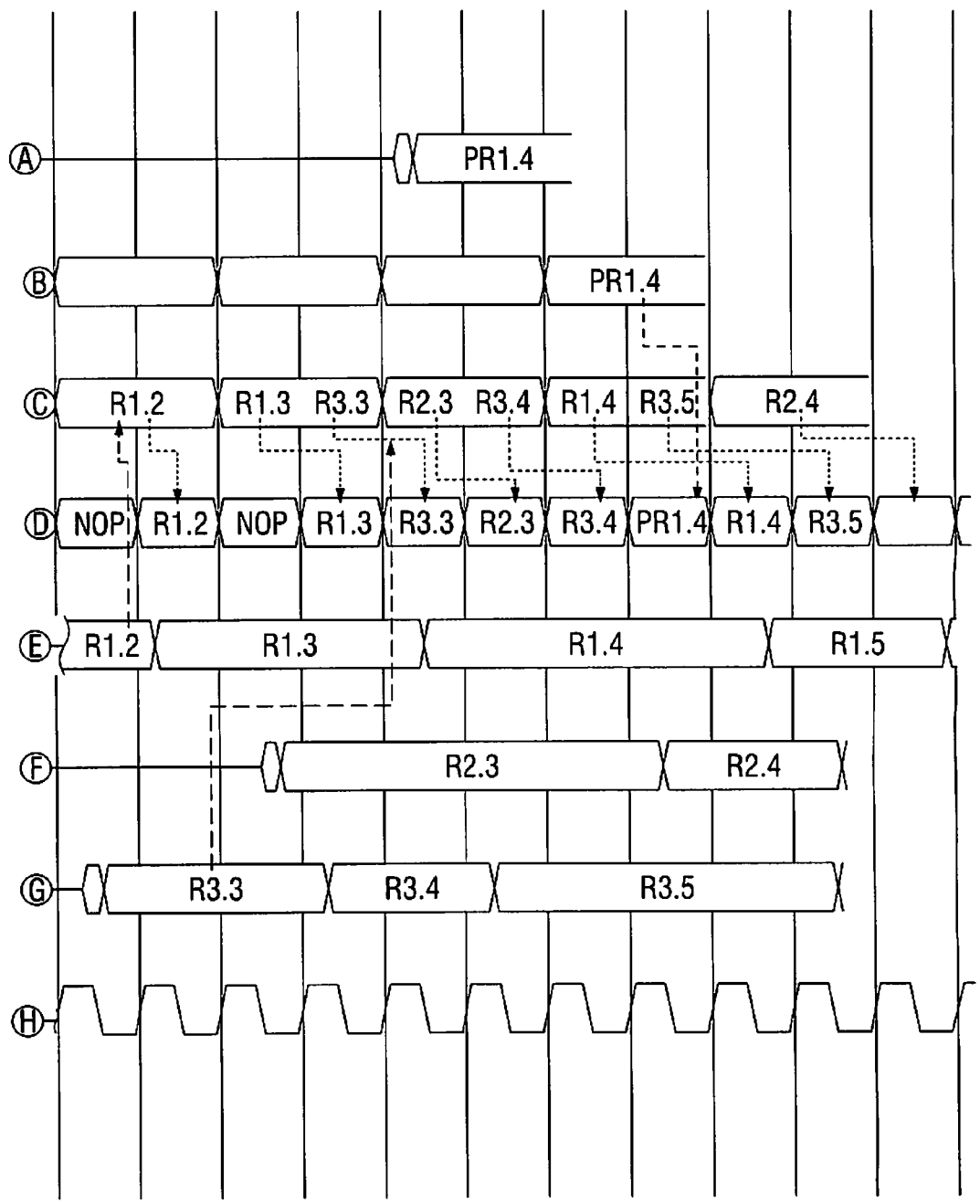

The timing diagram 500 of FIGS. 5a and 5b illustrates how memory access requests as received from the various clients are multiplexed by the memory access controller 202 onto the interface of the shared memory 144; the timing diagram is split across FIGS. 5a and 5b due to size, wherein the character references A-H designate the common point of each signal. In particular, it can be seen that the latency time of a memory access request from the high priority client 134 is low compared to the latency time of a memory access request from one of the low priority clients.

In the timing diagram 500, consecutive memory access requests from the high priority client 134 are denoted as PR1.1, PR1.2, and so on. Consecutive memory access requests from the first, second and third low priority clients are denoted R1.1, R1.2, . . . ; R2.1, R2.2, . . . ; and R3.1, R3.2, . . . . As illustrated in FIGS. 5a and 5b by different types of arrows, the high priority client 134 sends its requests directly to the high priority client port 204 of the memory access controller 202, while the low priority clients send their respective requests to the access arbiter 208, which multiplexes these requests to the low priority client port 206 of the memory access controller 202.

As may be gathered from FIGS. 5a and 5b, the memory access controller 202 prioritizes requests received at the high priority client port 204 (i.e., from the high priority client 134) over requests received via the access arbiter 208 at the low priority client port 206 (i.e., from any of the low priority clients). This can be seen, for example, from the fact that although the high priority request PR1.2 and the low priority request R2.2 are received concurrently within the same time slot by the memory access component 200, the high priority request PR1.2 is served earlier by the memory access controller 202 than the low priority request R2.2. The high priority request PR1.2 may, for example, be a request from the RLCevo module 168 regarding the reading of a layer 1 TB from the shared memory 144. The low priority request R2.2 may, on the other hand, be a memory access request from the hardware accelerator integrated in the FPGA 122A regarding the writing of a new layer 1 TB.

FIGS. 5a and 5b further illustrates the access scheduling performed by the access arbiter 208. As shown, the two low priority requests R1.1 and R3.1 are received concurrently within the same time slot by the access arbiter 208. The access arbiter 208, however, prioritizes request R1.1, which is thus served earlier by the memory access controller 202 than the request R3.1.

It can further be seen from FIGS. 5a and 5b that the memory access controller 202 allows a full collision access of the client ports 204, 206. This full collision access becomes apparent from the fact that the memory access controller 202 can in principle serve requests received via different client ports 204, 206 within the same time slot (see, e.g., low priority request R3.4 and high priority request PR1.4). The capability of full collision access is a result of the fact that the shared memory is clocked at a rate of 156 MHz, which is twice the clock rate of the clients 134, 122A, 122B, 138.

Figure 6:
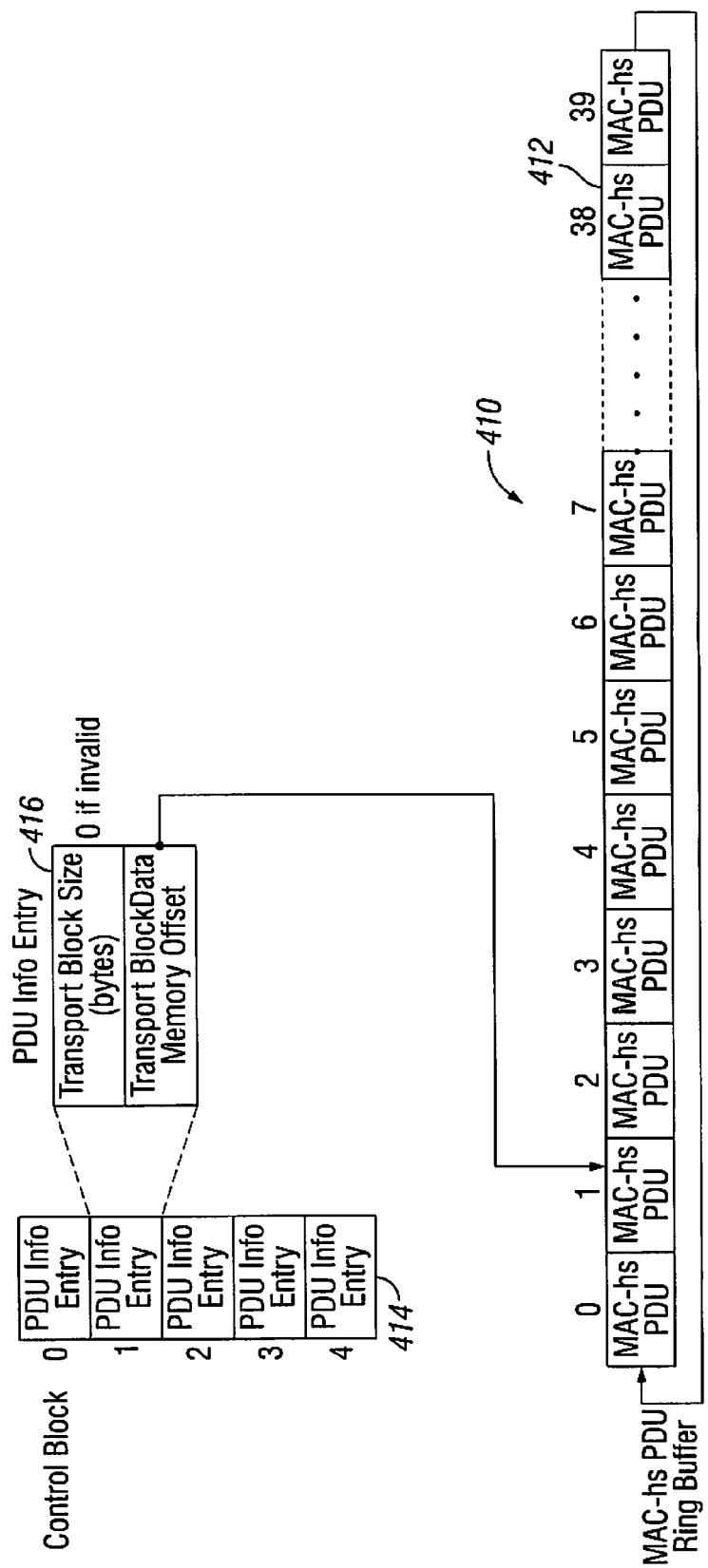
FIG. 6 illustrates the configuration of a layer 1 data partition of the shared memory of FIG. 3 as a ring buffer.
Figure 7:
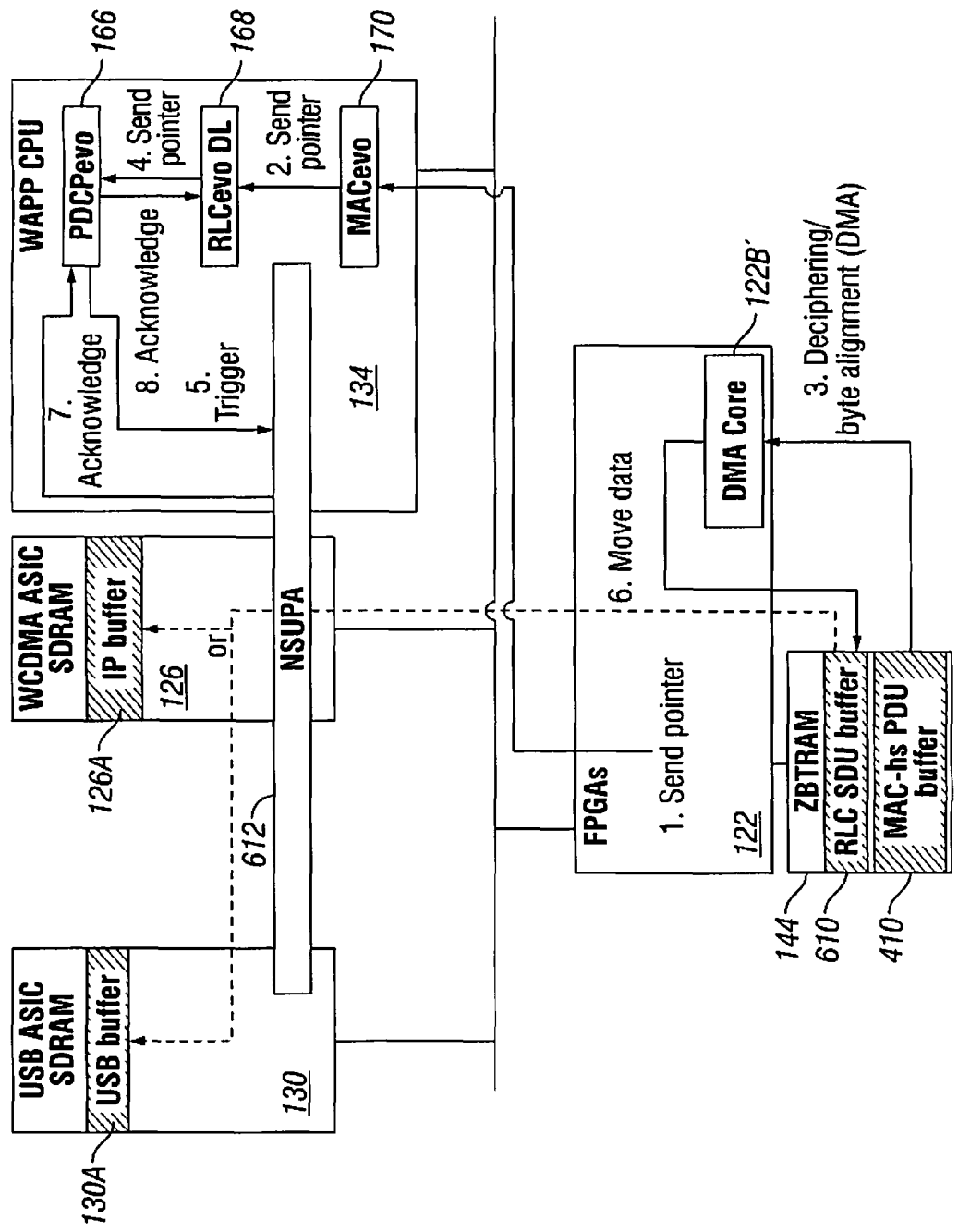
FIG. 7 is a schematic diagram illustrating memory accesses to the shared memory of the device shown in FIG. 1.

Having thus described the configuration and operation of the memory access component 200 of FIG. 3, the configuration and operation of the shared memory 144 will be considered next with reference to FIGS. 6 and 7.

The shared memory 144 is divided into several partitions, including a first partition for storing layer 1 data (TBs in the form of MAC PDUs) and a second partition for storing layer 2 data (RLC and PDCP Service Data Units, or SDUs). As shown in FIG. 6, the partition for storing layer 1 data is configured as a ring buffer 410 allowing static memory mapping. Utilization of a ring buffer 410 avoids separate memory allocation and freeing operations in relation to the layer 1 partition. As a consequence, the data throughput is increased and data transfer latency reduced.

The ring buffer 410 of FIG. 6 comprises a plurality of memory segments 412 for receiving a layer 1 transport block (TB) each. Each memory segment 412 has the same, fixed length and a predefined position in the buffer 410. As a result, data size and data position information need not be communicated between the individual layers for data transfer (e.g., the information need not be communicated to the layer 2 process reading out the layer 1 TBs from the ring buffer), which likewise increases data throughput and reduces data transfer latency. In one variant, only the arrival of a new TB in the ring buffer is signalled. This signalling may be performed via IPC between the DSP 142 and the WAPP processor 134. IPC may also be used to signal initial data reception (including the size and the position of the received data).

The exemplary ring buffer 410 shown in FIG. 6 consists of 40 memory segments 412 for storing 40 TBs (MAC PDUs). A specific TB will thus be overwritten by the 41$^{st}$ TB received after this specific TB. In the memory segments 412, TBs are stored in accordance with the layer 1 timing. If a layer 1 TB is not processed in time (i.e., read out by the responsible layer 2 process), it will be overwritten. It is therefore advantageous to prioritize reading of layer 1 TBs by layer 2 processes over writing of layer 1 TBs by layer 1 processes.

Information regarding the location of an individual TB in the ring buffer 410 is stored in a control block 414 in on-chip memory of the FPGA 122A or the DSP 142. As shown in FIG. 6, each PDU information entry in the control block 414 comprises the TB size of the specific PDU as well as a pointer (offset information) regarding the location of the specific PDU in the ring buffer 410. For invalid TBs, the TB size is set to 0. The memory offset between individual memory segments 412 is statically fixed in the ring buffer 410. In the case the size of a TB is smaller than the size of a memory segment 412, the rest of the memory segment 412 up to the next predefined offset position (i.e., up to the next memory segment 412) will be intentionally left free.

The control block 414 contains information for up to ten PDUs in the case of MIMO operation (5 PDUs, or "sub-frames", per frame and per stream in the case of two MIMO streams). Once the control block 414 has been completed, the transfer of the MAC-hs PDUs to the responsible layer 2 process (the MACevo module 170 in FIG. 2) is invoked by writing into the PHYevo-MACevo 'Send Data' register. This, in turn, causes the FPGA 122A to raise an interrupt to the WAPP processor 134 initiating a reading of the MAC-hs PDUs specified in the control block 414 from the ring buffer 410 as will be described in more detail with reference to FIG. 7 below.

While the ring buffer 410 in the embodiment of FIG. 6 is shown to consist of 40 memory segments, the number of memory segments may, of course, be increased or decreased as needed. Typically, the number of memory segments 412 in the ring buffer 410 depends on the MACevo window size.

In the case of a MACevo window size of 32 PDUs, the ring buffer 410 may, for example, comprise 80 memory segments 412 that may be occupied as follows. 64 memory segments may be occupied by the PDUs corresponding to a single MACevo window (32 PDUs per stream in the case of two-stream MIMO). Another ten memory segments 412 are reserved to provide a margin of at least one frame between subsequent MACevo windows (in the case of 5 sub-frames, or PDUs, per frame and two MIMO streams). Furthermore, another 6 memory segments 412 are required to round-up to the nearest frame size. The maximum TB size (and therefore MAC-hs PDU size) is 43,200 bits per sub-frame. Subtracting 24 bits per sub-frame for the Cyclic Redundancy Check (CRC) code, this corresponds to a memory requirement for the ring buffer 410 of 431,760 Bytes in the case of 80 memory segments 412.

It is to be noted that the layer 2 processing operates on the data in the ring buffer 410 in situ, which means that the data is only copied when building MAC-d or RLC PDUs (using the MAC hardware accelerator functionality). The corresponding memory transfer of the MAC-hs PDUs from the ring buffer 410 to the buffers of higher communication layers in the case of eHSPA downlink will now be described with reference to the schematic diagram of FIG. 7.

FIG. 7 illustrates the main components participating in this data transfer, namely the shared memory 144, the FGPA 122A, the WAPP processor 134 as well as one of the SDRAMs 126 and 130. FIG. 7 also shows the underlying messaging between the involved components. For clarity reasons, the USB processors 136, 138 are not shown, although the USB scenario is also illustrated in FIG. 7.

As becomes apparent from FIG. 7, the shared memory 144 is divided in two memory partitions. A first memory partition is reserved for the ring buffer 410 and the storage of MAC PDUs (i.e., layer 1 data), while a second memory partition 610 is reserved for buffering RLC-SDUs (i.e., layer 2 data).

The data transfer process illustrated in FIG. 7 starts with receipt of new TBs that will be stored in the present embodiment in the form of MAC-hs PDUs in the ring buffer 410 (as shown in FIG. 6). At the same time the control block 414 will be updated with the corresponding TB sizes and TB locations in the ring buffer 410 (i.e., offset parameters).

The PHYevo module 174 (see FIG. 2) then informs in a first step illustrated in FIG. 7 the MACevo module 170 with a pointer where the new MAC-hs PDUs reside in the ring buffer 412. In the eHSPA downlink, the PHYevo module 174 delivers the data on a frame-by-frame basis (i.e. every 10 ms), with each frame containing up to 5 TBs at a time. This applies both in the MIMO configuration as well as in the Single Input Single Output (SiSO) configuration.

In a second step, the MACevo module 170 decodes the TB size, TB location and the standard protocol headers of the MAC-hs PDUs to see where the data should go. If the TBs are received in sequence, they can be processed by the following processing modules. The MACevo module 170 may thus inform the RLCevo DL module 168 with a pointer to the new TBs that new TBs have been received. If, on the other hand, the TBs are received out of sequence, they will be moved to another buffer within the shared memory 144 (in a third memory partition not illustrated in FIG. 7) until the missing TBs have been received or a time-out has occurred and the buffered TBs are discarded.

In a third step, the RLCevo DL module 168 examines the headers of the newly received MAC-hs PDUs and starts one or several byte alignment jobs. Also, the DMA hardware module 122B' on the FGPA 122B prepares the RLC SDUs by removing the RLC headers. At the same time, the DMA hardware module 122B' will move the resulting RLC SDUs (or SDU fragments) from the ring buffer 410 into the RLC SDU buffer 610 within the shared memory 144. As the RLC SDUs (or SDU fragments) are not transferred into another physical memory, data transfer latency is kept low. Moreover, a high data throughput is obtained as the data need not be transferred via external memory interfaces, that often constitute data transfer bottlenecks.

When the SDUs or SDU fragments in the RLC SDU buffer 610 are ready for delivery, a set of pointers (pointing to the memory locations of the SDUs/SDU fragments in the RLC SDU buffer 610) is sent in a fourth step from the RLCevo DL module 168 to the PDCPevo module 166 in the form of a linked list. In the case several SDUs are available for delivery at the same time, all of them are signalled in a linked list to the PDCPevo module 166.

Then, in a fifth step, the PDCPevo module 166 triggers a Network Signalling User Plane Access (NSUPA) module 612 with the received set of pointers to remove the RLC SDUs from the RLC SDU buffer 610. The NSUPA module 612 concatenates the SDU fragments to IP packets. The NSUPA module 612 is run by the processors 134, 138 in FIG. 1 and above the IP and NS modules (see FIG. 2). The NSUPA module 612 can be considered as an interface or driver layer hiding the distributed deployment of the individual components illustrated in FIG. 1 inside a single ASIC 124, 128.

The NSUPA module 612 then transfers in a sixth step the IP packets to their destination. In case the destination is an application VoIP application on the WAPP processor 134, the IP packets are transferred to an IP buffer 126A in the SDRAM 126 coupled to the W-CDMA baseband processing ASIC 124. If, on the other hand, the destination is an external device coupled to the USB transceiver 140, then the IP packets are transferred to an USB buffer 130A in the SDRAM 130 coupled to the USB controller ASIC 128.

In a seventh step, the NSUPA module 612 acknowledges to the PDCPevo module 166 that the data has been delivered to any one of the buffers 126A, 130A. The PDCPevo module then relays this acknowledgement in an eighth step to the RLCevo DL module 168, which moves its reception window responsive to receipt of the acknowledge-ment.

The processes illustrated in FIG. 7 for the eHSPA downlink path use only the standardized headers (as defined in the applicable 3GPP specifications) to locate and access data (including layer 1, layer 2 and layer 3 data as well as IP data units) in the shared memory 144. This approach becomes possible because all the data are co-located in one and the same physical memory unit. As a result, specific timers, time stamps, flags as well as proprietary headers are not needed for locating and accessing such data.

Specifically, the header used to identify data such as TBs, PDUs, SDUs, data packets, etc. in the shared memory 144 will be part of the 3GPP specification of the respective communication protocol for each layer. While the header is thus analysed by the various processing clients in context with finding data in the shared memory, the payload (i.e., the user data) is not analysed (or validated) at all by these clients. This means that the payload is more or less ignored and forwarded to/retrieved by the next process as it is. An exception may be the case in which the payload must be decrypted (and thus processed by a ciphering client). The resulting process might be seen as just another DMA movement through the ciphering client which does not differ from other data movement tasks (see step 3 in FIG. 7).

A standard header will not include values for the address where the data is stored in the shared memory 144. Rather, the header only shows the status of the stored data, and this status may be used to judge how to further process the data (e.g., save the data in a separate buffer of the shared memory 144 if arrival time is too early; discard the data if the data are received outside a predefined reception window; shift the data to be aligned for the next stack stage if received in time but still requires ciphering; transfer data to next layer/process if arrived in the right order and in time; etc.).

As regards layer 2 processes, such processes may be configured to access directly only the absolute necessary part (header and not the payload) of the received data in the shared memory 144 to decide how the data shall be further processed. Thus, much less data need to be accessed in the shared memory (mainly MAC and RLC headers), which will decrease the overall layer 2 processing time and thus reduce data transfer latency.

To facilitate this approach, the shared memory 144 may be partitioned according to the communication layer and/or communication protocol as specified in the applicable 3GPP specifications (see, e.g., FIG. 7). In other words, the memory partitioning may be independent of the modular hardware architecture partitioning as illustrated in FIG. 1.

The shared memory 144 described herein provides several further advantages over other memory configurations. For example, the layer 1 data may remain in the shared memory during the complete layer 1 processing operations. In other words, the layer 1 data need not be (repeatedly) transferred to an ASIC or CPU memory, which reduces interface loads as well as data handling time (latency) and increases data throughput.

The movement (and optional ciphering) of payload may happen in the layer 1 memory partition of the shared memory 144 with high performance hardware accelerators, while the software modules will just control and delegate this process. As a result, the layer 1 processing speed is increased and software interaction is reduced. Layer 2 processes may move data inside the shared memory 144 (e.g., to and from MAC, from MAC to RLC and further to PDCP) using simple DMA or move commands directly executed by a hardware accelerator. For example, it will no longer be required to copy a decoded layer 1 TB from a local HARQ buffer of an ASIC providing layer 1 processing capabilities to a MAC reordering buffer (e.g., an external SDRAM) associated with a processor performing the reordering operation. Rather, according to the techniques described herein the data may remain in the shared memory 144 during HARQ processing and MAC reordering. The resulting "zero copy" approach advantageously avoids transferring layer 1 and layer 2 data between different memories.

It should be noted that several aspects described herein are not necessarily limited to the concepts of a shared memory and a prioritized layer 2 processing. Such aspects include the concept of a ring buffer for storing layer 1 data, the use of standard headers to identify and locate buffered data, and so on. The person skilled in the art will appreciate that these concepts can thus also be implemented in configurations different from the implementations discussed above in context with the exemplary embodiments.

While the present invention has been described with respect to particular embodiments, those skilled in the art will recognized that the present invention is not limited to the specific embodiments described and illustrated herein. It is to be understood that this disclosure is only illustrative. Accordingly, it is intended that the invention be limited only by the scope of the claims appended hereto.

The invention claimed is:

1. A device in a mobile terminal for providing network access in accordance with at least one layered network access technology that includes layer 1 processes and layer 2 processes, the device comprising:
- a shared memory configured to store at least layer 1 data and layer 2 data;
- a memory access component coupled to the shared memory and comprising a first client port configured to receive memory access requests from a layer 1 processing client, which processes radio transmission- or reception-related data, and a second client port configured to receive memory access requests from a layer 2 processing client, which processes radio-control related data, wherein the memory access component is configured to serve a memory access request from the layer 1 processing client with a lower priority than a memory access request from the layer 2 processing client; and
- a memory interface between the layer 1 processing client and the first client port, wherein the memory interface includes at least one first-in-first-out (FIFO) buffer to temporarily store a low priority memory access request until the low memory access request can be served.

2. The device of claim 1, wherein the memory access component is adapted to prioritize reading of layer 1 data by the layer 2 processing client over writing of layer 1 data by the layer 1 processing client.

3. The device of claim 1, wherein the memory access component is configured to multiplex to the first client port memory access requests from a set of two or more clients comprising the layer 1 processing client.

4. The device of claim 3, wherein the memory access component further comprises an access arbiter coupled between the first client port and the set of clients comprising the layer 1 processing client, wherein the access arbiter is adapted to perform the multiplexing of low priority memory access requests.

5. The device of claim 4, wherein the access arbiter provides a dedicated arbiter port for each client of the set of clients.

6. The device of claim 1, wherein the memory access component further comprises a memory access controller comprising at least the first client port and the second client port.

7. The device of claim 6, wherein the memory access controller is configured to multiplex the shared memory access requests received via the first client port and the second client port.

8. The device of claim 6, wherein the memory access controller is configured to enable full collision memory access among the client ports.

9. The device of claim 6, wherein the memory access controller is configured to assign different priorities to memory access requests received via different client ports.

10. The device of claim 1, wherein the shared memory has at least a first partition for storing layer 1 data and a second partition for storing layer 2 data.

11. The device of claim 10, wherein data movement within at least one of the partitions or from one partition to another partition is performed by pointer operations or linked lists.

12. The device of claim 1, wherein the shared memory further comprises a ring buffer for storing layer 1 data.

13. The device of claim 12, wherein the ring buffer is divided into a predefined number of individual memory segments, each memory segment being configured to receive one layer 1 transmission block.

14. The device of claim 1, wherein the shared memory is configured to enable a memory-based communication between at least layer 1 and layer 2 processes.

15. The device of claim 1, wherein:
- layer 1 processing includes at least one of signal modulation, signal spreading, transport error control, channel coding, turbo coding and encryption, layer 1 encoding, layer 1 decoding, HARQ processing; and
- layer 2 processing includes at least one of ciphering, Medium Access Control processing, Radio Link Control processing, and Package Data Convergence Protocol processing.

16. The device of claim 1, wherein the memory access component or a component thereof is realized as at least one of an Intellectual Property core and a Field Programmable Gate Array.

17. The device of claim 1, wherein headers as defined in a communication standard are used to locate and access data stored in the shared memory.

18. A method in a mobile terminal for providing network access in accordance with at least one layered network access technology comprising layer 1 processes and layer 2 processes, the method comprising:
- storing at least layer 1 data and layer 2 data in a shared memory;
- receiving by a memory access component, memory access requests from a layer 1 processing client, which processes radio transmission- or reception-related data, and from a layer 2 processing client, which processes radio-control related data; and
- performing by the memory access component, access arbitration in relation to the shared memory such that a memory access request from the layer 1 processing client is served with a lower priority than a memory access request from the layer 2 processing client; and
- temporarily storing a low priority memory access request in a first-in-first-out (FIFO) buffer in a memory interface between the layer 1 processing client and the memory access component until the low priority memory access request can be served.

19. A computer program product comprising program code portions stored on a non-transitory memory for performing the steps of claim 18 when the computer program product is run on one or more processors.

* * * * *